March 2, 1971     G. W. ROBINSON     3,566,494
BROACHING TOOL INSERT
Filed Aug. 6, 1968
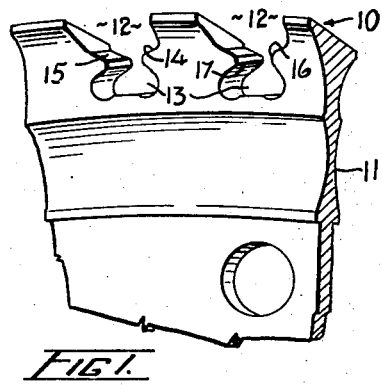
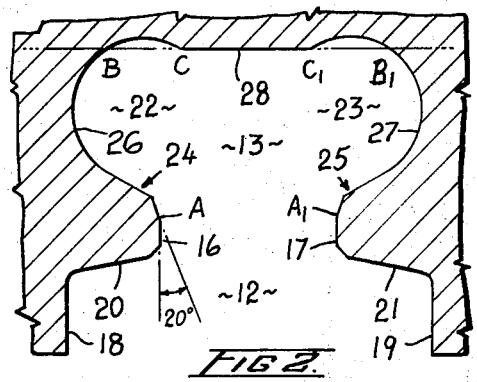
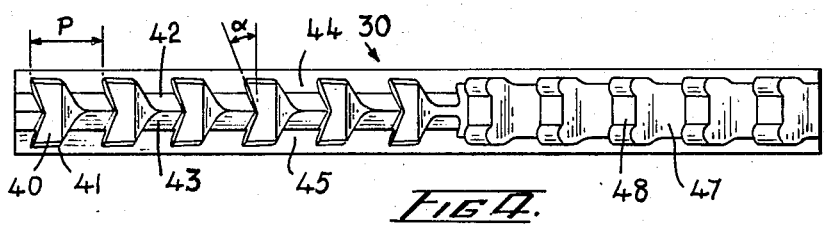
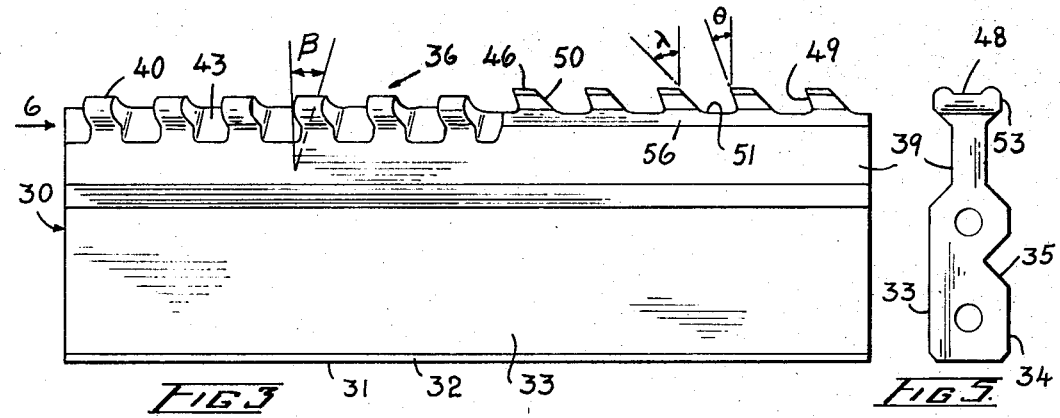
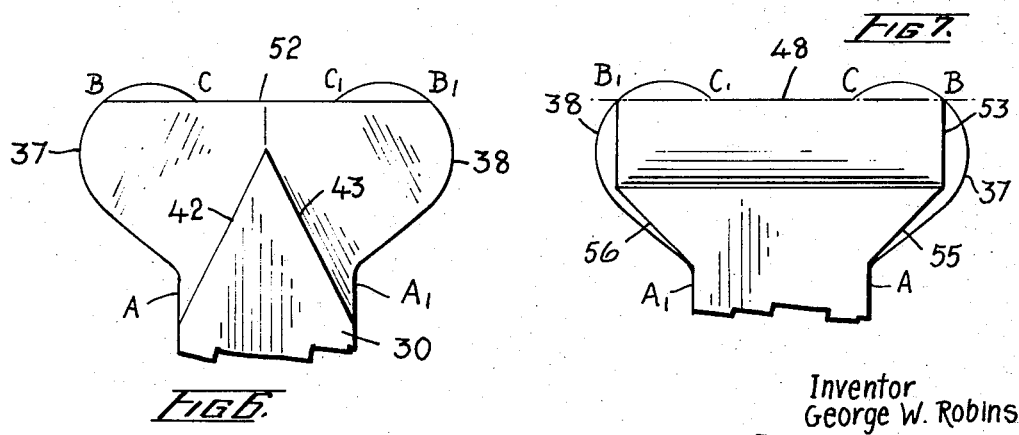
Inventor
George W. Robinson
By Maybee & Legris
Attorneys ём
United States Patent Office 3,566,494
Patented Mar. 2, 1971

3,566,494
BROACHING TOOL INSERT
George William Robinson, Rexdale, Ontario, Canada, assignor to Orenda Limited, Toronto, Ontario, Canada
Filed Aug. 6, 1968, Ser. No. 750,705
Claims priority, application Great Britain, Mar. 4, 1968, 10,476/68
Int. Cl. B23p *15/42;* B26d *1/04*
U.S. Cl. 29—95.1                                                   7 Claims

ABSTRACT OF THE DISCLOSURE

Broaching machine finishing tool insert, particularly for internal broaching of curvilinear forms in hard-to-machine materials wherein a very high standard of dimensional accuracy and surface finish is required, is formed with a plurality of groups of cutting teeth which finish cut selected portions of the surface sequentially instead of taking a full-form cut on each tooth as in normal practice.

BACKGROUND OF THE INVENTION

The broaching process is well known in the machining art and may be applied to internal surfaces and also to flat or other external surfaces. Internal broaching is applied in forming symmetrical or irregular holes, grooves or slots in machine parts, especially where size or shape make other machining processes impracticable.

Broaching machines may be classified generally into horizontal and vertical types. They may be further classified according to method of operation as to, for example, whether the broach in a vertical machine is pulled up or pulled down through the workpiece on its cutting stroke. In all types of broaching machine, however, the principle is the same: a series of multitoothed tool inserts arranged in contiguous, end-to-end relationship in a tool holder, which is attached to a power-operated slide, is caused to make a pass in contact with a workpiece. The cutting teeth vary in size and shape along the length of the tool inserts and remove metal chips successively to form a slot or groove having a form corresponding to the final configuration of the cutting teeth. The finishing cuts are made by an insert—usually shorter in length than the roughing tool cutters—having a depth of cut per tooth over the first few teeth of about 0.001 inch and no change in size over a number of the final teeth. In other words, the final teeth are all full-form cutting teeth.

It has been discovered that finishing tools ground in accordance with accepted practice have a very short between-grind life and, moreover, do not produce a good surface finish in many hard-to-machine materials such as the high-nickel, alloy steels used in gas turbine compressor and turbine disc fabrication, where slots of quite complex curvilinear cross-section in the periphery of these discs are required to receive and retain the roots of the compressor and turbine blades. Arcuate surfaces subtending large angles at their centres of curvature are particularly prone to poor finishing due to interference of the chip as it rolls inwardly from the tool cutting edge and breaks off.

SUMMARY OF THE INVENTION

The present invention is based on the discovery that the above-mentioned disadvantage can be overcome by finishing different portions of an internal cut sequentially, instead of taking a full form cut with each tooth.

Accordingly the invention provides a finishing tool insert for an internal broaching machine for the internal broaching of a surface of arcuate profile in a workpiece, wherein the tool insert is formed with a plurality of longitudinally spaced groups of cutting teeth each having an arcuate cutting edge conforming to a respective fractional length of the profile of a surface to be broached, the teeth of each group being of similar profile, and the cutting edges of successive groups of teeth conforming to successive fractional lengths of the profile of said surface, whereby the successive fractional lengths are cut sequentially by longitudinal movement of the tool insert relative to the workpiece. Each group of teeth is ground for the most efficient cutting and chip removal in the section of the slot it finishes. All finish cuts are arranged to blend into each other.

BRIEF DESCRIPTION OF THE DRAWINGS

One embodiment of the invention will be described, by way of example, with reference to the accompanying drawings in which:

FIG. 1, is a fragmentary view of a portion of the peripheral edge of an axial compressor wheel disc showing typical broached slots for receiving the root ends of compressor blades;

FIG. 2, is a line diagram showing an enlarged cross-sectional form of a blade slot;

FIG. 3, is a side elevation of a finishing tool insert ground in accordance with the invention;

FIG. 4, is a plan view of the tool insert shown in FIG. 3;

FIG. 5, is an end elevation of the tool insert shown in FIG. 3;

FIG. 6, is an enlarged view of a portion of the tool insert shown in FIG. 3, viewed in the direction of the arrow 6; and FIG. 7, is an enlarged view of a portion of the tool insert shown in FIG. 5.

DESCRIPTION OF THE PREFERRED EMBODIMENT

It will be observed in FIG. 1 that the blade slots in the flared rim 10 of an axial compressor wheel disc, a fragment of which is shown at 11, each comprise an outer portion 12 and an inner portion 13 separated by opposed, cantilevered shoulders 14 and 15, the latter having spaced-apart free end surfaces 16 and 17, respectively. As shown in FIG. 2, the outer portion 12 of the slot has parallel sides 18 and 19 which are radiused into sloping outer surfaces 20 and 21 of the shoulders 14 and 15, which outer surfaces are chamfered at their juncture with end surfaces 16 and 17.

The inner portion 13 of a blade slot is formed by undercutting the shoulders 14 and 15 to form curvilinear bays 22 and 23 respectively. The bays are delineated by compound diverging plane surfaces generally indicated at 24 and 25 and commencing at points A and $A_1$, on the shoulder end surfaces 16 and 17 respectively, and surfaces 26 and 27 of arcuate profile terminating at points C and $C_1$ respectively which contain the plane of a bottom platform 28. Points B and $B_1$ on the curved surfaces 26 and 27 are in the same plane as points C and $C_1$.

A complete slot of the type shown in FIGS. 1 and 2 is fully machined in two operations. In one machine, the outer slot portion 12 and a straight-sided radially inwardly projecting slot, down to within a finishing allowance of the platform 28 and including finishing cuts on the shoulder end surfaces 16 and 17, are formed. In a second machine, the surfaces of the bays 22 and 23 and platform 28 are cut and finished.

Machining the outer portion 12 of the slot presents no problems, and conventionally ground roughing and finishing tool inserts are used. In the second machining operation a finishing tool insert according to the present invention is required, and this tool insert will now be described in detail. For the purpose of this description, the cutting teeth will be referred to by numbering from left to right in FIGS. 3 and 4.

The last roughing tool insert in the series before the finishing insert, produces the form of the inner slot portion 13, dimensioned to include a small finishing allowance. Referring now to FIGS. 2 through 7, it will be noted that the broaching tool insert generally indicated at 30 comprises an elongated body having upper and lower edges 36 and 31, and a pair of side faces 33 and 34. The tool insert is formed from a precision-ground, tool-steel bar of rectangular cross-section. The lower edge 31 is bevelled at 32 and one side face is a plane surface while the opposite side face 34 is provided with a longitudinal V-groove 35 which is adapted to accommodate projections on the clamping blocks of a broach tool holder (not shown).

The edge 36 of the tool blank is ground to the full contour of a cutting tooth, i.e. from points A through B to C, to form a lobe 37 (See FIGS. 6 and 7) on one side, and from $A_1$ through $B_1$ to $C_1$ to form a lobe 38 on another side, plus a final grind allowance. Below points A and $A_1$ the tool blank is ground to form a narrow, longitudinal supporting web 39 which passes freely between the inner end surfaces 16 and 17 of the shoulders 14 and 15 respectively.

Longitudinally spaced cutting teeth such as 40 are individually formed on the edge 36 of the tool blank by means of shaped grinding wheels. In the preferred embodiment, the tooth pitch P is 0.5 in. and a land 41 is 0.16 in. The lobes 37 and 38 are ground with opposite rake angles $\alpha$ of 20° and similar shear angles $\beta$ of 20°. Diverging bottom surfaces 42 and 43 of gullets 44 and 45 formed in grinding the lobes 37 and 38 are oppositely inclined at 20° to the plane of symmetry of the tool and the apex is broken and faired into the back of each land 41 as clearly shown in FIGS. 3 and 4. The first six teeth, constituting a first group of cutting teeth, are ground in this manner.

Teeth such as 46, constituting a second group of cutting teeth, are formed differently as may be clearly seen from FIGS. 3 and 4. Gullets such as 47 are formed transversely of the tool edge 36, normal to the longitudinal axis thereof, to give the same tooth pitch $P_1$ of 0.5 inch and a land 48 of 0.16 inch. A tooth leading surface 49 is ground to a rake angle $\theta$ of 20°, and a tooth trailing surface 50 is ground to an angle $\lambda$ of 45°. Both surfaces 49 and 50 of successive teeth are radiused into a bottom surface 51 of each gullet.

Having formed the cutting teeth as described, all teeth are finish ground to size. The first five teeth of the first group will vary in depth of cut per tooth from 0.002 in. to 0.001 in. with no change between the fifth and sixth teeth. A flat 52 (FIGS. 4 and 6) is then ground on the top of each of the first six teeth corresponding to the plane B—C—$C_1$ $B_1$ in FIG. 2. This leaves a cutting edge extending along lobe 37 from A to B (FIG. 7) and along lobe 38 from $A_1$ to $B_1$, each of these cutting edges being an arcuate cutting edge conforming to a fractional length, AB or $A_1B_1$ (FIG. 2) of the profile of the surface to be broached. On the tooth side surfaces, a backoff or clearance angle of 3° is formed.

As best seen in FIG. 7, lateral flats 53 and 54 and angled flats 55 and 56 are ground on each of the second grop of teeth, thereby removing cutting edges from points A to B and $A_1$ to $B_1$ on lobes 37 and 38 respectively. This leaves arcuate cutting edges extending from points B to C and $B_1$ to $C_1$, which conform to a fractional length BC, $B_1C_1$ (FIG. 2) of the profile of the surface to be broached.

It will be appreciated that in a finishing operation, during which the broaching tool insert is moved longitudinally in one direction relatively to the workpiece to finish a blade slot, successive complementary lengths AB, BC and $A_1B_1$, $B_1C_1$, of the arcuate surfaces ABC, and $A_1B_1C_1$, are machined sequentially during each machining or broaching stroke, and so that necessity for taking a full form cut along an extended arcuate surface subtending a large angle at its centre of curvature is avoided. These teeth are finish ground to give a depth of cut per tooth varying from 0.002 inch to 0.001 inch over the first four teeth and no change between the fourth and fifth teeth. The same backoff or clearance angle of 3° is given to each tooth cutting edge. Some small degree of overlap of the cutting edges of the teeth of the first group and the teeth of the second group will have to obtain at points B and $B_1$ in order to blend the two cuts together in the finished surface of the slot being formed.

In a finishing broaching operation, as the first group of teeth of the finishing tool insert are drawn through the slot, the large 20° shear angles of the teeth produce progressively growing rolling chips along the slot surfaces over the fractional lengths of profile A to B and $A_1$ to $B_1$. The 20° rake angles of the teeth will tend to throw the chips clear of the cutting edges and into the gullets 44 and 45 away from the slot surfaces. Most important of course is the fact that a big chip is not formed and the cutting edge of the tooth is permitted to take a clean cut uninterrupted by particles of swarf. Hitherto, this condition has been obtained with teeth having no shear angle and cutting over the full slot form.

The second group of teeth, following on, cut the slot surfaces over the fractional lengths of profile from B to C and $B_1$ to $C_1$. As already state, some overlap is allowed at points B and $B_1$ so that the cuts produced by the two teeth will blend with the previously cut surfaces. As a matter of convenience in the present instance, a further tool insert, conventionally ground, may be placed behind the tool insert of the invention to finish cut the platform 28. This insert could have been integrally ground with present insert whereby the one insert would have then finish cut the slot in three progressive stages.

It will be realized that the forgoing is by way of example and that slots and the like of more complex contour could be finish cut in a number of stages not necessarily in lineal succession, as in the present case. Although various combinations of rake and shear angle have been tried with full-form cutting teeth, it is only with the present invention that a significant increase in between-grind tool life and improved finish have been obtained.

What I claim as my invention is:

1. A finishing tool insert for an internal broaching machine for the internal broaching of a surface of concave arcuate profile in a workpiece, the tool insert having a plurality of longitudinally spaced groups of cutting teeth each having an arcuate cutting edge, the teeth of each group being of similar profile and conforming to a respective fractional length of the required profile to be broached, and the cutting edges of successive groups of teeth conforming to successive fractional lengths of the profile to be broached, whereby the successive fractional lengths are cut sequentially by longitudinal movement of the tool insert relative to the workpiece.

2. A finishing tool insert according to claim 1, in which the cutting edges of successive grops of teeth, which conform to respective successive fractional lengths of said surface, overlap to a small degree so that the cuts made by successive groups of teeth blend together.

3. A finishing tool insert for an internal broaching machine for the internal broaching of a surface of concave arcuate profile in a workpiece, the tool insert comprising an elongated body having upper and lower edges and a pair of side faces, the upper edge being ground to provide longitudinally spaced, first and second groups of cutting teeth each having an arcuate cutting edge, the teeth of each group being of similar profile and conforming to a respective fractional length of the required profile of a surface to be broached, and the cutting edges of the teeth of said first and second groups conforming to complementary fraction length of the profile of said surface, whereby the complementary fractional lengths are cut sequentially by longitudinal movement of the tool insert relative to the workpiece, the teeth of each group being spaced longitudinally.

4. A finishing tool insert according to claim 3, in which the cutting edges of successive groups of teeth, which conform to respective successive fractional lengths of said surface, overlap to a small degree so that the cuts made by successive groups of teeth blend together.

5. A finishing tool insert for an internal broaching machine for the internal broaching of a surface of concave arcuate profile in a workpiece, the tool insert comprising an elongated body having upper and lower edges and a pair of side faces, the upper edge being ground to provide longitudinally spaced, first and second groups of cutting teeth each having an arcuate cutting edge, the teeth of each group being of similar profile and conforming to a respective fractional length of the required profile of a surface to be broached, the cutting edges of the teeth of said first and second groups conforming to complementary fractional lengths of the profile of said surface, whereby the complementary fractional lengths are cut sequentially by longitudinal movement of the tool insert relative to the workpiece, the teeth of each group being spaced longitudinally, the cutting teeth of the first group being spaced longitudinally by gullets, each gullet having a bottom surface formed with diverging sides.

6. A finishing tool insert according to claim 5, the tool insert having a plane of symmetry passing through said upper edge, wherein the sides of said bottom surface are oppositely inclined at about 20° to said plane of symmetry.

7. A finishing tool insert according to claim 5, in which the cutting teeth of the second group are spaced longitudinally by gullets, each gullet having a flat bottom surface and the teeth having leading and trailing surfaces which are radiused into said flat bottom surface.

References Cited

UNITED STATES PATENTS

| | | | |
|---|---|---|---|
| 2,140,146 | 12/1938 | Tautz | 29—95.1 |
| 2,161,901 | 6/1939 | Praez | 29—95.1 |
| 2,330,863 | 10/1943 | Bonnafe | 29—95.1 |
| 2,697,271 | 12/1954 | Phaneuf | 29—95.1 |
| 2,770,028 | 11/1956 | Bonnafe | 29—95.1 |
| 2,986,801 | 6/1961 | Mentley | 29—95.1 |
| 3,231,962 | 2/1966 | Psenka | 29—95.1 |

FOREIGN PATENTS

| | | | |
|---|---|---|---|
| 1,156,295 | 10/1963 | Germany | 29—95.1 |

HARRISON L. HINSON, Primary Examiner